F. G. SARGENT.
Belting for Wool-Washers.

No. 207,626.                    Patented Sept. 3, 1878.

Witnesses:
Donn J. Twitchell
Will N. Dodge.

Inventor:
F. G. Sargent.
By his attys
Dodge &Sons

UNITED STATES PATENT OFFICE.

FREDERICK G. SARGENT, OF GRANITEVILLE, MASSACHUSETTS.

IMPROVEMENT IN BELTING FOR WOOL-WASHERS.

Specification forming part of Letters Patent No. 207,626, dated September 3, 1878; application filed June 22, 1878.

*To all whom it may concern:*

Be it known that I, FREDERICK G. SARGENT, of Graniteville, in the county of Middlesex and State of Massachusetts, have invented certain Improvements in Endless Aprons and Belts for Wool-Washers, &c., of which the following is a specification:

The object of my invention is to secure the proper guidance of flat endless aprons or belts on the rolls or pulleys upon which they are mounted without causing a waste of power, and in such manner as to admit of the belt spreading laterally without being crimped or wrinkled; and to this end it consists in providing a flat belt with an internal longitudinal guiding-rib to run in a corresponding groove in the roll or pulley, or with a groove to receive a flange upon the pulley or roll. The invention is designed more especially for use in connection with rubber or other elastic aprons used as conveyers in wool-washing and other similar machines, and which, passing between presser-rolls, are compressed and expanded laterally; but the improvement may be used to good advantage in connection with driving and other similar belts.

It is to be distinctly noted that my rib or groove is intended for and answers the sole purpose of a guide; that it does not constitute the body or frictional part of the belt, but is merely an addition thereto; and that, being very narrow as compared with the width of the belt, it admits of the latter expanding and contracting laterally without wrinkling or straining.

I am aware that belts have been made of a V form to run in corresponding grooves, in order to give an increased adhesion, and also that two such belts have been united closely side by side, and arranged to run in corresponding grooves, the V-shaped portions forming the body, and extending the full width of the belt.

Figure 1:
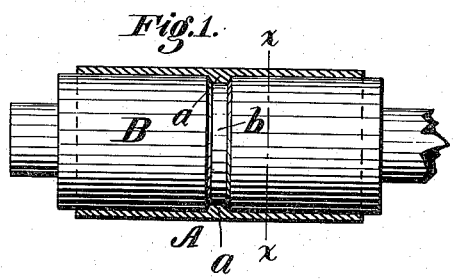
Figure 2:
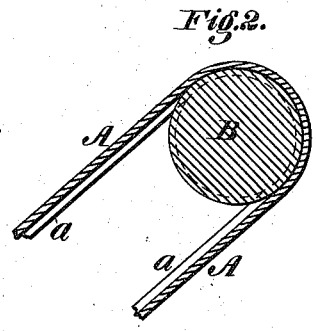
Figure 3:
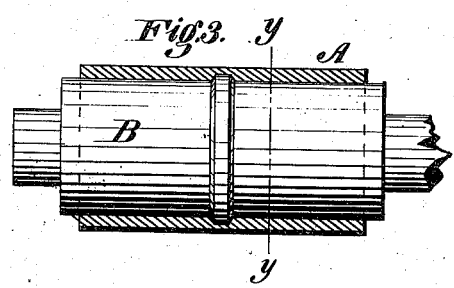
Figure 4:
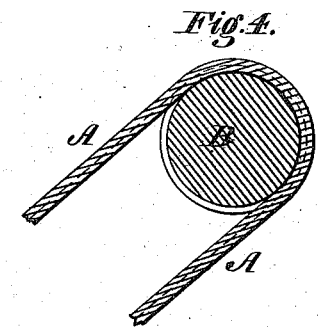
Figure 5:
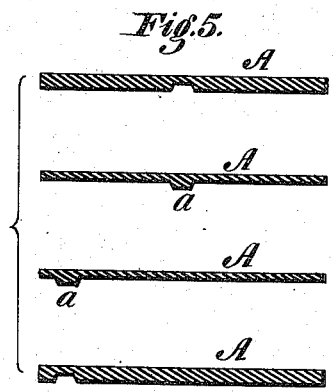
Figure 6:
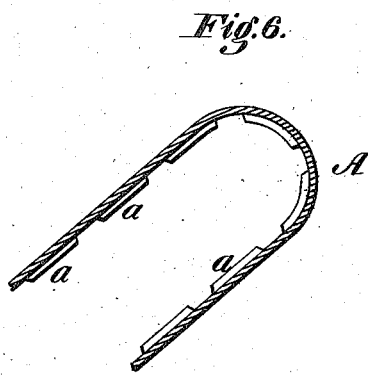

Referring to the accompanying drawings, Figure 1 represents a transverse section of one form of my belt applied to a roll; Fig. 2, a cross-section of the same on the line $x$ $x$; Fig. 3, a cross-section of another form of the belt applied to a corresponding roll; Fig. 4, a cross-section of the same on the line $y$ $y$; Fig. 5, cross-sections of the various forms of the belt; Fig. 6, a longitudinal section of a belt, showing a modified form of the guiding-rib.

In the various figures, A represents the belt or apron, and B the roll upon which it is mounted. In Figs. 1 and 2 the belt is provided on its inner surface with a narrow longitudinal central rib, $a$, of a tapering or V form in cross-section, and the roll provided with a corresponding groove, $b$, in which the rib is seated.

The rib is preferably made of the V form and in one continuous unbroken length; but its sectional form may be modified, and it may be divided into short sections or lengths, as represented in Fig. 6, in order to enable it to adapt itself the more readily to the curvature of the roll or pulley. While it is preferred to locate the rib in the center of the belt, as shown, it may be located at either edge, or at any intermediate point desired.

Referring to Figs. 3 and 4, it will be seen that the belt, instead of having a projecting rib, is provided in its inner face with a continuous longitudinal groove, into which a corresponding rib on the roller enters, as shown, the arrangement being merely the reverse of that represented in Figs. 1 and 2, the mode of operation and result secured being essentially the same under the two forms of construction. In cases where they can be used to advantage two or more ribs or grooves may be employed in connection with the same belt; but where the belts are subject to a material lateral expansion only a single rib or groove can be used.

Having thus described my invention, what I claim is—

1. A flat endless apron or belt provided with a narrow longitudinal guiding rib or groove, substantially as shown and described.

2. An endless belt or apron having flat inner and outer faces, with a narrow guiding rib or groove on the inside, in combination with a roll having a corresponding groove.

3. A belt having a wide flat inner face, with a narrow rib, $a$, thereon, in combination with a roll, B, having a groove, $b$.

FREDERICK GRANDERSON SARGENT.

Witnesses:
ALLAN C. SARGENT,
ARTHUR B. PLIMPTON.